(12) United States Patent
Li et al.

(10) Patent No.: US 11,606,671 B2
(45) Date of Patent: Mar. 14, 2023

(54) METHOD FOR MINING SOCIAL ACCOUNT OF TARGET OBJECT, SERVER, AND STORAGE MEDIUM

(71) Applicant: Tencent Technology (Shenzhen) Company Limited, Guangdong (CN)

(72) Inventors: Lin Li, Guangdong (CN); Peixuan Chen, Guangdong (CN); Qian Chen, Guangdong (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 482 days.

(21) Appl. No.: 15/974,964

(22) Filed: May 9, 2018

(65) Prior Publication Data

US 2018/0262883 A1 Sep. 13, 2018

Related U.S. Application Data

(63) Continuation of application No. PCT/CN2016/106806, filed on Nov. 22, 2016.

(30) Foreign Application Priority Data

Jun. 6, 2016 (CN) .......................... 201610395583.1

(51) Int. Cl.
*G06Q 50/00* (2012.01)
*H04W 4/08* (2009.01)
(Continued)

(52) U.S. Cl.
CPC .............. *H04W 4/08* (2013.01); *G06F 40/30* (2020.01); *G06Q 50/01* (2013.01); *H04L 51/52* (2022.05)

(58) Field of Classification Search
CPC ......... G06Q 50/01; H04L 51/52; H04W 4/08; G06F 40/30
See application file for complete search history.

(56) References Cited

U.S. PATENT DOCUMENTS

| 8,626,835 B1 * | 1/2014 | Gyongyi | ............... G06F 16/285 |
| | | | 709/204 |
| 9,098,819 B1 * | 8/2015 | Korula | ................... G06Q 50/01 |

(Continued)

FOREIGN PATENT DOCUMENTS

| CN | 101118557 A | 2/2008 |
| CN | 102004788 A | 4/2011 |

(Continued)

OTHER PUBLICATIONS

Machine Translation of KR-20150089386-A, provided by Espacenet, available at: https://worldwide.espacenet.com/patent/search/family/053885844/publication/KR20150089386A?q=pn%3DKR20150089386A (Year: 2015).*

(Continued)

*Primary Examiner* — Lynda Jasmin
*Assistant Examiner* — Brendan S O'Shea
(74) *Attorney, Agent, or Firm* — Crowell & Moring LLP

(57) ABSTRACT

Embodiments of the present disclosure disclose a method for mining a social account of a target object, a server, and a storage medium. The method includes locating a target social group which the target object belongs to by using attribute information of the target object. The method includes parsing preset information of a social account in the target social group and obtaining first identity information of a user corresponding to the social account. The method also includes determining whether the first identity information matches with second identity information of the target object. When it is determined that the first identity information matches with the second identity information of the (Continued)

target object, the method further includes labeling the social account corresponding to the first identity information as a target social account of the target object.

10 Claims, 8 Drawing Sheets

(51) Int. Cl.
*G06F 40/30* (2020.01)
*H04L 51/52* (2022.01)

(56) References Cited

U.S. PATENT DOCUMENTS

| | | | | |
|---|---|---|---|---|
| 9,384,571 | B1* | 7/2016 | Covell | G06Q 10/10 |
| 2012/0209909 | A1 | 8/2012 | Huang et al. | |
| 2014/0067808 | A1* | 3/2014 | Narang | G06Q 10/04 |
| | | | | 707/737 |
| 2014/0214824 | A1 | 7/2014 | Mai et al. | |
| 2015/0032653 | A1* | 1/2015 | Iyer | G06Q 10/10 |
| | | | | 705/319 |
| 2015/0172419 | A1* | 6/2015 | Toledo | G06Q 50/01 |
| | | | | 709/203 |
| 2015/0213370 | A1* | 7/2015 | Chakrabarti | G06N 7/005 |
| | | | | 706/52 |

FOREIGN PATENT DOCUMENTS

| | | |
|---|---|---|
| CN | 103455615 A | 12/2013 |
| CN | 103514230 A | 1/2014 |
| CN | 103646060 A | 3/2014 |
| CN | 104572732 A | 4/2015 |
| CN | 105022761 A | 11/2015 |
| CN | 105302810 A | 2/2016 |
| CN | 105608120 A | 5/2016 |
| CN | 106126521 A | 11/2016 |
| JP | 2017-142796 A | 8/2017 |
| KR | 10-2007-0072723 A | 7/2007 |
| KR | 20150089386 A * | 8/2015 |
| WO | WO 2014/179427 A1 | 11/2014 |

OTHER PUBLICATIONS

Goga, Oana, et al. "On the reliability of profile matching across large online social networks." Proceedings of the 21th ACM SIGKDD International Conference on Knowledge Discovery and Data Mining. 2015. (Year: 2015).*

Office Action with translation dated Oct. 30, 2019 for Korean Application No. 10-2018-7013604, 15 pages.

Office Action dated May 20, 2019 for Japanese Application No. 2018-524809, 6 pages.

* cited by examiner

| type | Community ID | Group name | Group ID | Group member number | Group number of the group community |
|---|---|---|---|---|---|
| M | 64116338 | Ecological full marketing of Tiny Times | 772464186 | 97 | 443 |
| M | 64116338 | Logistics, after-sales services, and quality | 3241709088 | 97 | 443 |
| M | 64116338 | Wonderful plays | 3238685994 | 93 | 443 |
| M | 64116338 | M inventor interaction group | 597495721 | 88 | 443 |
| M | 64116338 | International business communication group | 422938338 | 88 | 443 |
| M | 64116338 | August 13, 2015 M Trainees of the same term | 916654458 | 87 | 443 |
| M | 64116338 | User operation center | 3590783070 | 86 | 443 |
| M | 64116338 | June 4, 2015 M Trainees of the same term | 28781901 | 85 | 443 |
| M | 64116338 | EPL squads | 3831494310 | 84 | 443 |
| M | 64116338 | Dream training camp-Run in our youth! | 134317501 | 84 | 443 |
| M | 64116338 | Go to USA; Together executive group | 174376783 | 83 | 443 |
| M | 64116338 | Super TV items to be renewed | 3849161008 | 81 | 443 |
| M | 64116338 | X green garden-Cantonese film fans | 3274197517 | 81 | 443 |
| M | 64116338 | Shopping mall, technology, and customer service communication group | 44602276 | 80 | 443 |
| M | 64116338 | Integrating marketing | 807259874 | 79 | 443 |
| M | 64116338 | M EPR project group | 3461723979 | 78 | 443 |

FIG. 6

| type | Community ID | Group name | Group ID | Group member number | uin Real-name prediction |
|---|---|---|---|---|---|
| M | 64116338 | Election at expiration of office terms for the board of directors and the board of supervisors | 1920023777 | 6 | |
| M | 64116338 | Election at expiration of office terms for the board of directors and the board of supervisors | 1920023777 | 6 | |
| M | 64116338 | Election at expiration of office terms for the board of directors and the board of supervisors | 1920023777 | 6 | |
| M | 64116338 | Election at expiration of office terms for the board of directors and the board of supervisors | 1920023777 | 6 | |
| M | 64116338 | Election at expiration of office terms for the board of directors and the board of supervisors | 1920023777 | 6 | 2178524521 A0.936 A0.04 A0.023 A0.96 A0.015 A 0.013 |
| M | 64116338 | Election at expiration of office terms for the board of directors and the board of supervisors | 1920023777 | 6 | |

| uin | Name | Group community ID | Group ID | Group name | Group member number | Group number of the group community | Member number of the group community |
|---|---|---|---|---|---|---|---|
| 2178524521 | A | 64116338 | 3422938338 | International business communication group | 88 | 6774 | 7276 |
| 2178524521 | A | 64116338 | 3461723979 | M EPR project group | 78 | 6774 | 7276 |
| 2178524521 | A | 64116338 | 3128876770 | □ Le Holdings ☼ | 76 | 6774 | 7276 |
| 2178524521 | A_ | 10810880 | 980156607 | "Fun on a desktop" special discussion on operation | 76 | 1369 | 2917 |
| 2178524521 | A | 264817783 | 3115199106 | Changjiang C6 fellow-students association | 75 | 33 | 151 |
| 2178524521 | A | 64116338 | 833282177 | Le 1 Pro US | 75 | 6774 | 7276 |
| 2178524521 | A | 64116338 | 720076370 | Continuous cooperation with stars at the super mobile phone release | 75 | 6774 | 7276 |
| 2178524521 | A | 64116338 | 3290020587 | Right protection WeChat group of M legal affairs department | 66 | 6774 | 7276 |

FIG. 10

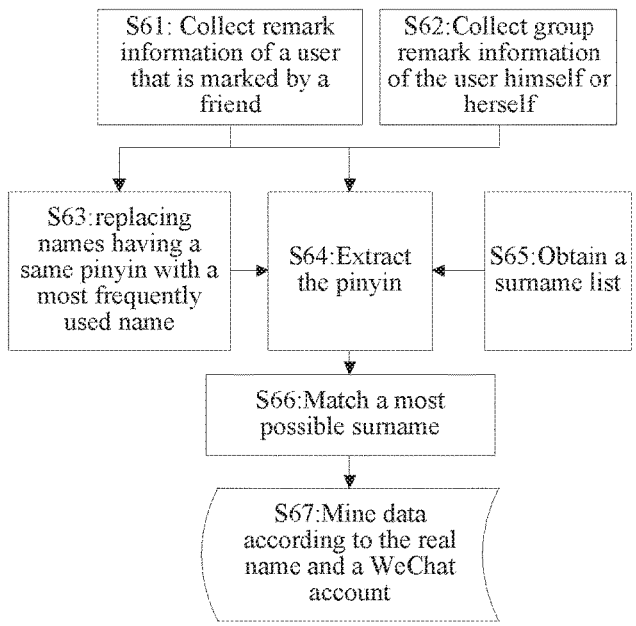

METHOD FOR MINING SOCIAL ACCOUNT OF TARGET OBJECT, SERVER, AND STORAGE MEDIUM

CROSS-REFERENCE TO RELATED APPLICATIONS

This application is a continuation application of PCT Patent Application No. PCT/CN2016/106806, filed on Nov. 22, 2016, which claims priority to Chinese Patent Application No. 201610395583.1, filed on Jun. 6, 2016, both of which are incorporated herein by reference in their entireties.

FIELD OF THE TECHNOLOGY

The present disclosure relates to the field of information technologies, and in particular, to a method for mining a social account of a target object, a server, and a storage medium.

BACKGROUND OF THE DISCLOSURE

With the proliferation of the mobile Internet, performing daily communication, information synchronization, opinion expression, and other behaviors by using social networks is quite popular among people. Common social applications that can be applied to social networks for social activities include WeChat, QQ, Douban, and the like.

In a social process, there are often some persons having great social influence, such as opinion leaders. The opinion leaders express opinions, share articles, and the like by using their social accounts, so as to influence other users to a larger extent than those persons who are not opinion leaders. During specific implementation, sometimes the social accounts having great influence need to be mined and identified, to achieve greatest activity influence with limited resources by means of influence of the accounts. For example, when an advertisement is presented to a particular group of people, precision of mining the particular group of people is quite important to a click rate. For another example, in a bank credit reporting project, an attribute of a group of people is a quite important reference factor. In an aspect of safety assurance, social networks are used to help locate malicious users or even law-breakers rapidly. Mining of a particular group of people for an advertisement, reference to an attribute of a group of people, and locating of malicious users are all related to mining of a social account of a target object. In the prior art, a plurality of methods of mining a social account of a target object is provided, for example, similarity-based mining provided by Facebook, mining according to a network behavior of a social account, and mining based on social organization division. However, during actual application, the methods as mentioned above turn out to have certain problems and issues, for example and not limited to low precision, and high calculation complexity.

SUMMARY

In view of this, embodiments of the present disclosure provide a method for mining a social account of a target object, a server, and a storage medium, so as to resolve at least a part of the foregoing problems, and to improve the internet technology.

To achieve the foregoing objective, the technical solutions of the present disclosure are implemented as follows.

According to an aspect, an embodiment of the present disclosure provides a method for mining a social account of a target object. The method includes locating, by a device comprising a memory and a processor in communication with the memory, a target social group comprising a target object by using attribute information of the target object. The method includes parsing, by the device, preset information of a social account in the target social group, and obtaining first identity information of a user corresponding to the social account. The method also includes determining, by the device, whether the first identity information matches with second identity information of the target object. The method further includes when it is determined that the first identity information matches with the second identity information of the target object, labeling, by the device, the social account corresponding to the first identity information as a target social account of the target object.

According to another aspect, an embodiment of the present disclosure provides a server. The server includes a memory storing instructions and a processor in communication with the memory. When the processor executes the instructions, the instructions are configured to cause the server to locate a target social group comprising a target object by using attribute information of the target object. When the processor executes the instructions, the instructions are configured to cause the server to parse preset information of a social account in the target social group, and obtain first identity information of a user corresponding to the social account. When the processor executes the instructions, the instructions are also configured to cause the server to determining whether the first identity information matches with second identity information of the target object. When it is determined that the first identity information matches the second identity information of the target object, the instructions are further configured to cause the server to label the social account corresponding to the first identity information as a target social account of the target object.

An embodiment of the present disclosure further provides a non-transitory computer readable storage medium storing instructions. The instructions, when executed by a processor, cause the processor to perform locating a target social group comprising a target object by using attribute information of the target object. The instructions, when executed by a processor, cause the processor to perform parsing preset information of a social account in the target social group, and obtaining first identity information of a user corresponding to the social account. The instructions, when executed by a processor, also cause the processor to perform determining whether the first identity information matches with second identity information of the target object. When it is determined that the first identity information matches with the second identity information of the target object, the instructions, when executed by a processor, further cause the processor to perform labeling the social account corresponding to the first identity information as a target social account of the target object.

According to the method for mining a social account of a target object, the server, and the storage medium provided in the embodiments of the present disclosure, identity information of a user is extracted from preset information of a social account, and then the extracted identity information is matched with offline identity information of the user, so as to precisely locate a social account of the target user. By means of the matching between the online identity information and the offline identity information, precision can be improved. In addition, compared with another method for determining the social account of the target user, for example, according to a large number of behaviors in a social account, the method of matching directly by means of the identity information further has advantages. The advantages includes and are not limited to, only a small amount of information that needs to be processed, low calculation complexity, and simple calculation.

BRIEF DESCRIPTION OF THE DRAWINGS

FIG. 6 is a schematic diagram of an effect of a candidate social group according to an embodiment of the present disclosure;

FIG. 7 is a schematic diagram of an effect of a target social group according to an embodiment of the present disclosure;

FIG. 8 is a first schematic diagram of an effect of mining user information of a social account according to an embodiment of the present disclosure;

FIG. 9 is a second schematic diagram of an effect of mining user information of a social account according to an embodiment of the present disclosure;

FIG. 10 is a schematic diagram of an effect of another social group in which a target object joins according to an embodiment of the present disclosure;

FIG. 11 is a schematic flowchart of an identity information mining method according to an embodiment of the present disclosure.

DESCRIPTION OF EMBODIMENTS

The following further describes the technical solutions of the present disclosure with reference to the accompanying drawings and specific embodiments. It should be understood that, embodiments described below are merely for illustration and explanation of the present disclosure, but not for limiting the present disclosure.

Figure 1:
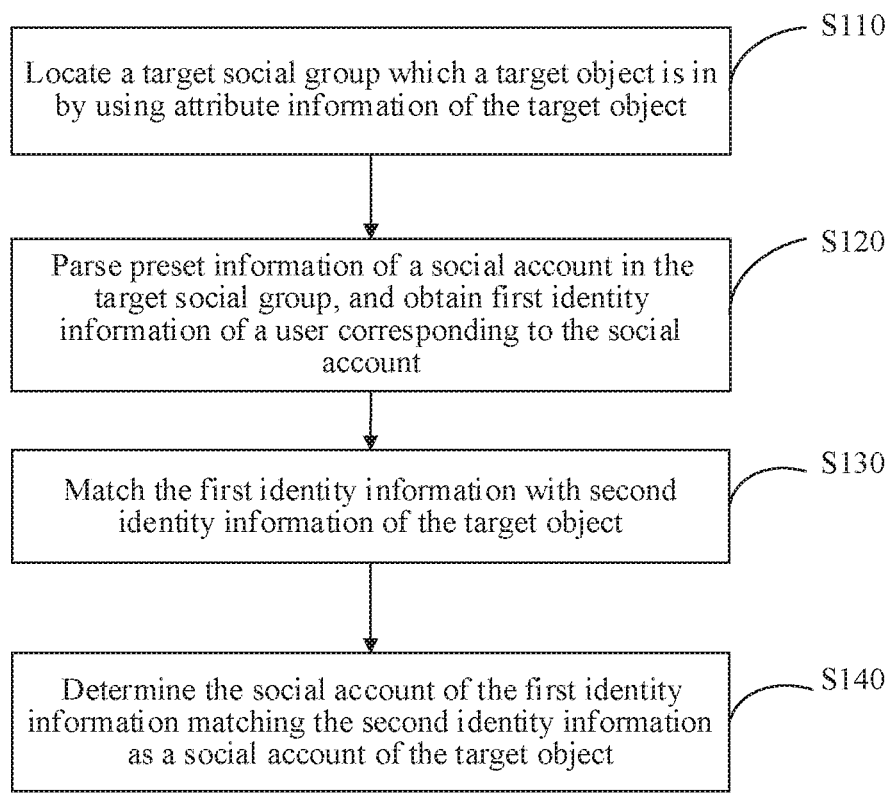
FIG. 1 is a schematic flowchart of a method for mining a social account of a target object according to an embodiment of the present disclosure.

As shown in FIG. 1, an embodiment provides a method for mining a social account of a target object, includes:

Step S110: Locate a target social group which the target object is in by using attribute information of the target object;

Step S120: Parse preset information of a social account in the target social group, and obtain first identity information of a user corresponding to the social account;

Step S130: Match the first identity information with second identity information of the target object; and Step S140: Determine a social account of the first identity information matching the second identity information as a social account of the target object. In one embodiment, this step may include, when the first identity information is successfully matched with second identity information of the target object, determining the social account corresponding to the first identity information to be a social account of the target object.

The method for mining a social account of a target object provided in this embodiment may be applied to various electronic devices which are capable of processing information. In one embodiment, when applied to a distributed computer network, the method may be performed by a plurality of devices.

The target object in this embodiment may be a target user. The social group may include at least one of various virtual or on-line organizations having a social function, and usually includes at least two members. The social group may include at least one of various groups such as a WeChat group and a QQ group.

The attribute information of the target object may include various characteristic information, for example but not limited to, identity information, job information, and age information. In step S110, relatively unique attribute information of the target object is usually selected, for example, attribute information that can be used to uniquely distinguish the target object from another user. For example, when the target object is Mr. B, as a founder of an enterprise Y, a key word such as "enterprise Y" or "senior executive of the enterprise Y", or even a term such as "Mr. B" or "founder of an enterprise Y" may be used as attribute information of Mr. B, to determine the target social group. For example, if "senior executive of the enterprise Y" is information of the target object, by means of information matching, a social group whose name or name remark is "senior executive of the enterprise Y" can be found and used as the target social group. In this case, it is usually of relatively high probability that the social account of the target object is in the target social group.

In step S120, the preset information of the social account in the target social group is parsed. Herein, the preset information may include information such as a nickname and account identification of the social account in the target social group. For ease of recognition in social activities, some users usually add identity information such as a name used in daily life to various remark information, instead of performing social activities only by using a network name. For example, a nickname field of a social account in a group may include Li Na. Li Na may be a name for the user which is used in the user's daily life, or may even be a name used for the user's ID card or passport. The first identity information may include an offline appellation of the user. The offline appellation may include a surname and a given name, for example, "Li Na", or may include a job title, for example, "President of Peking University". All the information may be the first identity information, and can indicate an offline identity of the user. The second identity information may be information received by an electronic device for performing the method in this embodiment from another electronic device, or from a human-computer interaction interface. For example, when a current target object is the senior executive of the enterprise Y, "senior executive of the enterprise Y" is used as a searching term, and it is possible to find information such as a directory of senior executives of the enterprise Y and corresponding job titles.

In step S130, the first identity information extracted from the social account is matched with the second identity information of the target object. When the matching is successful, it indicates that it is quite possible that a corresponding account is the social account of the target object, and therefore it may be considered that the social account of the target object is found. Apparently, the social account of the target object is mined. The method in the present disclosure for locating the social account of the user in combination with the offline identity information of the user has the advantages, such as low complexity and high precision.

In this embodiment, to mining the social account of the target object more adequately, a target social group first needs to be precisely located. The following provides an optional method for locating a target social group conveniently, rapidly, and precisely. Specifically, step S110 may include:

matching a group attribute of a candidate social group with the attribute information; and selecting a social group having a group attribute matching the attribute information as the target social group.

Generally, a social group may include a group name, a group label, or the like, which correspond to the social group. The group name or the group label is parts of the group attribute. The group attribute such as the group name can reflect, to some extent, identity information of a user corresponding to a social account in the social group. In this embodiment, directly by means of matching based on a group name, some target social groups can be found conveniently and rapidly. However, sometimes, group names of some social groups cannot desirably reflect identity information of a member in the social group. In this embodiment, the following method is used, to mine the social account of the target object when a group name cannot precisely reflect identity information of a member in the group. The method may further include:

establishing a group community, the group community including at least two social groups which satisfy a preset degree of association relationship;

performing information clustering on attribute information of the social groups, determining a clustering subject, and determining a target clustering subject matching the attribute information with a matching degree therebetween satisfying a preset matching degree; and filtering out the group community unrelated to the target clustering subject, and obtaining a target group community related to the target clustering subject, a social group in the target group community being a candidate social group.

When a target object is in a plurality of social groups, there is a same social account in the social groups. In this case, the social groups may be considered to satisfy a preset degree of association relationship.

In this embodiment, a group community is established; the group community includes at least two social groups. A group member in the social groups corresponds to a user of a social account.

Information clustering is performed on the social groups in the group community. The information clustering may include: extracting a group name of each social group, using the group name as a document, and performing subject clustering by using latent dirichlet allocation (LDA), to obtain a clustering result. The LDA is also referred to as a three-layer Bayesian probability model, including a three-layer structure. The three layers respectively correspond to phrases, subjects, and documents. According to the LDA, each phrase in a document is obtained by mean of a process in which "a subject is selected at a probability, and a phrase is selected from the subject at a probability". A relationship between a document and a subject conforms to polynomial distribution, and a relationship between a subject and a phrase conforms to polynomial distribution. In addition, the LDA is an unsupervised machine learning technology, and may be used to recognize subject information hidden in a large-scale document set or corpus.

Certainly, the attribute information of the group community is not limited to the group name, and may further include a chat history in a group, or at least one group document stored in a group space of the social group in the group community, or information extracted from a group picture stored in the group space in the social group in the group community.

In conclusion, by means of subject clustering, an association degree between a plurality of group communities can be determined. Next, a target clustering subject conforming to the attribute information of the target object is selected to filter out group communities. For example, there is a plurality of group communities. By means of information clustering, it is found that some group communities are related to a university A, and the other group communities are related to a university B. The target object is a professor of the university A. Next, the university A is selected as the target clustering subject, and group communities unrelated to the university A are filtered out, to obtain a target group community. In this embodiment, when filtering-out is performed on the group communities according to the target clustering subject, fuzzy matching may be performed between the target clustering subject and a community attribute of a group community, to locate the target group. The fuzzy matching does not completely include the target clustering subject, and may include a synonym of the target clustering subject or the like, so as to make it as much as possible that a target group community which the target object is in is not filter out. A social group in the target group community is a candidate social group.

After the candidate social group is selected, a target social group matching the attribute information of the target object is selected from the candidate social group by means of precise matching. The precise matching usually requires complete matching between two items matched, and matching between two synonymous items is not the precise matching, so as to precisely locate the target social group, reduce a number of social groups which the target object is not in, and reduce amount of data that needs to be subsequently processed, to lower processing complexity and computation. The determining the target social group may include: first performing precise matching by using the attribute information of the target object and a group attribute of a social group in the candidate group community, to select a group community for which a number of successful precise matching is more than a preset precise matching threshold as the target group community; and then using the social group in the target group community as the target social group. In one embodiment, matching may be performed again by using the group attribute of the target user and a social group in the target group community. In another embodiment, matching may be performed again by using the attribute information of the target object to match a social group in the target group community. The matching may be combined with the foregoing fuzzy matching. When the fuzzy matching is successful, a social group for which the fuzzy matching is successful is the target social group.

Certainly, other than the foregoing method, methods for determining the candidate social group may include directly considering all social groups in a social platform as candidate social groups, and the like.

Before the target group community is selected, each independent group needs to classified into a group community. Classification may be performed by means of group name or other group information clustering. The following provides another optional method having high clustering precision.

The establishing a group community includes:

first establishing a community network including at least two social groups, where the at least two social groups are nodes in the community network. When a first node and a second node include a same social account, a directed edge is arranged between the first node and the second node; and an edge weight of the directed edge is equal to a ratio of the first value and the second value, where the first value is a number of same social accounts included in both the first node and the second node, and the second value is a number of social accounts included in the second node. In this embodiment, an edge is a directed edge. The directed edge is an edge having a direction. In this embodiment, the directed edge is an edge in a direction from a node to another node.

Figure 2:
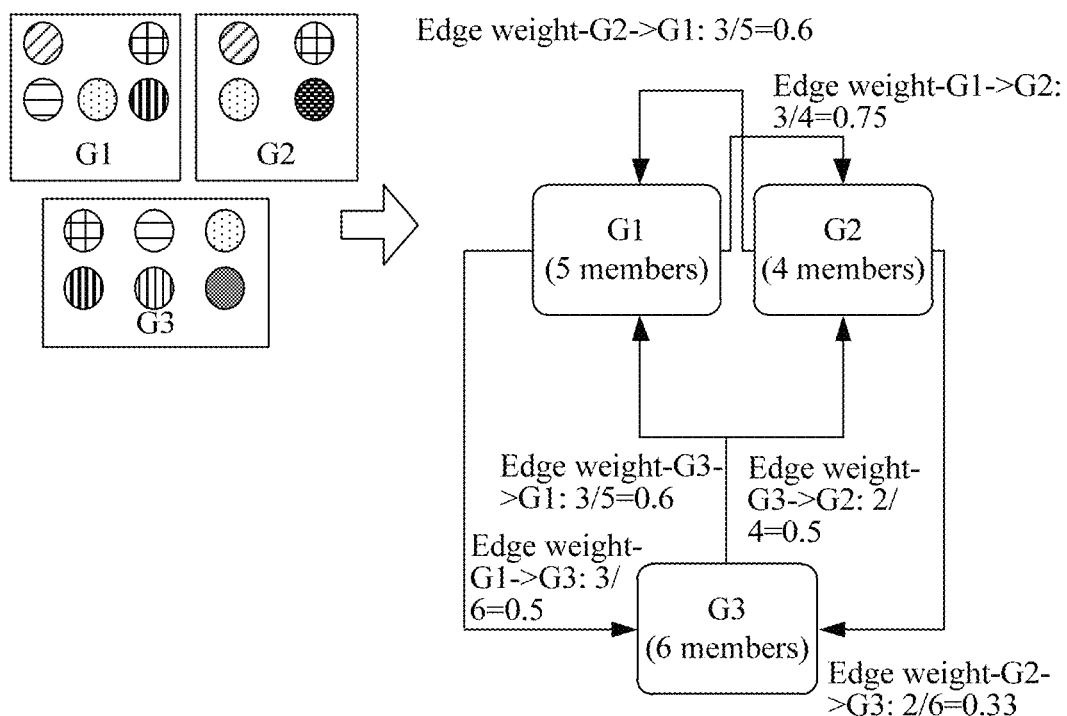
FIG. 2 is a schematic flowchart of a community network establishment method according to an embodiment of the present disclosure.

FIG. 2 shows 3 social groups, and are respectively G1, G2, and G3. G1 includes 5 members, and each member corresponds to a social account. G2 includes 4 members. G3 includes 6 members. In FIG. 2, small circles filled with a same pattern represent a same social account. Therefore, as can be learned from FIG. 2, a number of same social accounts in G1 and G2 is 3, a number of same social accounts in G2 and G3 is 2, and a number of same social accounts in G1 and G3 is 3. A social account included in two social groups may be referred to as a shared social account.

A community is established by using G1, G2, and G3 in FIG. 2. A community network is shown on the right side in FIG. 2. For the establishment of the community network, specifically, the community network may be established, for example, by establishing a community diagram.

The community diagram has the following characteristics:

Diagram type: Directed diagram;

Diagram node: A social group corresponds to a node in the diagram;

Diagram edge: A connection line between two nodes having a same group member.

After the community network is established, an edge weight needs to be calculated.

During calculation of the edge weight, a first value of a shared social account is compared with a second value of a social account included in a node, to obtain the edge weight. For example, an edge weight of a directed edge from G1 to G2 may be calculated by using the following formula:

$$W_{Gy \to Gx} = \text{Count}_{com}(Gy, Gx)/\text{Count}(Gx),$$

$W_{Gy \to Gx}$ represents an edge weight from a social group Gy to a social group Gx. $\text{Count}_{com}(Gy, Gx)$ represents a shared social account of the social group Gy and the social group Gx. $\text{Count}(Gx)$ is a social account of a social group.

Therefore, as shown in the community diagram shown in FIG. 2, the edge weight from G1 to G2 is: 3/4=0.75; an edge weight from G1 to G3 is: 3/6=0.5; an edge weight from G2 to G1 is: 3/5=0.6; an edge weight from G2 to G3 is: 2/6=0.33; an edge weight from G3 to G1 is: 3/5=0.6; and an edge weight from G3 to G2 is 2/4=0.5.

Then, the community network is traversed, each node is used as a target node, and a node label of a neighboring node of the target node and an indegree edge weight of a corresponding indegree edge are collected, where the indegree edge weight is an edge weight of a directed edge in a direction from the neighboring node to the target node, and the target node is a node in the community network. In this embodiment, the traversing the community network is: using each node as the target node each time. Each node corresponds to a node label, and an initial value of the node label may be a node identifier corresponding to the node. For example, if G1 is a target node, an indegree edge of G1 includes two directed edges which are respectively an directed edge from G2 to G1 and an directed edge from G3 to G1, and corresponding indegree edge weights are respectively 0.5 and 0.6. Apparently, the directed edge from G3 to G1 has a larger edge weight. If G1 is the first target node that is traversed, a node label of G1 is replaced with a node label of G3. Because an initial value of a node identifier of G3 is a node identifier of G3 itself, a node label of G1 is, after being updated, the node identifier of G3.

Then, the indegree edge weights corresponding to a same node label are added. Before traversing, a node label of each node is the node itself. After some nodes are traversed, node labels of the nodes are replaced with node identifiers of other nodes. At this time, some of directed edges of a target node may be corresponding to a same node identifier. Therefore, the weights of the indegree edges corresponding to the same node label need to be added.

Next, a node label of the target node is replaced with a node label corresponding to a maximum indegree edge weight. After addition, edge weights of all the directed edges of the target node and node labels corresponding to the directed edges are obtained, and a node label corresponding to the maximum edge weight is selected, to replace the node label of the target node.

Finally, after the community network is traversed, social groups having a same node label are classified into a group community. After all the nodes in the community network are traversed, some or all of the node labels are updated. In this embodiment, social groups having a same node label are classified into a same group community. Apparently, any two of the social groups in the group community obtained in this manner have a same social account. Therefore, social groups may satisfy a preset degree of association relationship: any two of the social groups in the group community includes at least a same social account.

Step S120 may include:

extracting remark information of each social account in the target social group, the remark information being information used to mark an identity of the user; and extracting the first identity information from the remark information.

Apparently, there is some user information of the social account in remark information of the social account. The user information may include information such as a name of a user. Therefore, the first identity information may be extracted from the remark information. The first identity information may include a name, a nickname, or the like of the user. The remark information may be corresponding to information in a plurality of fields that can indicated an identity of the user in the social account.

Specifically, for example, the remark information includes at least one of a friend remark information, a group remark information, and an account remark information, where the friend remark information is remark information made by a friend account of a first social account on the first social account, the group remark information is remark information of the first social account in the social group, and the account remark information is remark information made by the first social account on the identity of the user.

When using a social account, a user may change an account name of the social account directly into his or her own name or nickname. After joining a social group, the user may set remark information or label information such as a group nickname or a group appellation in the social group. The group nickname or the group appellation in the social group may be a nickname or an appellation of the social account used and recognized in the social group. After a social account is added as a friend of another social account, remark information of the social account may be directly set to a user name of the user of the social account and the like by a user friend. Therefore, in this embodiment, the first identity information may be extracted from the information, so as to perform matching in step S130. When the first identity information is to be matched with the second identity information, matching may be performed directly. In this embodiment, to avoid that a name is incorrectly written in the first identity information, for example, the name is written into a homonym. In one embodiment, step S130 may include: extracting articulation information of the first identity information; and step S140 may include: matching the articulation information of the first identity information with articulation information of the second identity information. In another embodiment, step S130 may include: extracting pronunciation information of the first identity information; and step S140 may include: matching the pronunciation information of the first identity information with pronunciation information of the second identity information.

The articulation or pronunciation information may be a Chinese pinyin. In this embodiment, by means of matching based on the Chinese pinyin, a problem that even though the first identity information and the second identity information represent a same person, the matching is a failure because some Chinese characters are incorrectly written can be avoided, to increase a matching success rate.

When there is a plurality of the target objects and the target objects are associated with each other, the method further includes:

extracting a friend account of the target object whose social account is determined; and parsing preset information of the friend account, and obtaining the second identity information to be matched with the first identity information.

The target object may be corresponding to a plurality of target users. For example, the target object is a senior executive of an enterprise Y, and apparently, there may be a plurality of target objects. In addition, the plurality of target objects is associated with the senior executive of the enterprise Y. Based on the association relationship, the target objects may be friends of each other. The friend relationship may be reflected in friend accounts of a social account. Therefore, in this embodiment, a target object whose social account is determined is used as a seeded user. A friend account of the social account of the seeded user is extracted, and the preset information of the friend account is parsed again. In this way, a location of the social account of the target object is expanded. For example, a target object A has a friend, a target object B, and the target object B may not be in a target social group. By means of parsing on a relationship link between friends, the target object A is used as a seeded user, and a social account of the target object B can be located, thereby increasing a success rate of determining the social account of the target object.

Figure 3:
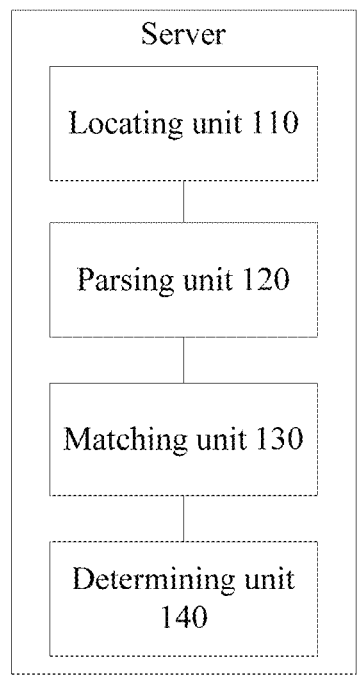
FIG. 3 is a schematic structural diagram of a server according to an embodiment of the present disclosure.

As shown in FIG. 3, an embodiment further provides a server, including a locating unit 110, a parsing unit 120, a matching unit 130, and a determining unit 140. The locating unit 110 is configured to locate a target social group which a target object is in by using attribute information of the target object. The parsing unit 120 is configured to parse preset information of a social account in the target social group, and obtain first identity information of a user corresponding to the social account. The matching unit 130 is configured to match the first identity information with second identity information of the target object. The determining unit 140 is configured to determine a social account of the first identity information matching the second identity information as a social account of the target object.

In this embodiment, the locating unit 110, the parsing unit 120, the matching unit 130, and the determining unit 140 may all be corresponding to an information processing structure in a server. The information processing structure may include a processor such as a central processing unit (CPU), a microprocessor (MCU), a digital signal processor (DSP), a programmable array logic (PLC), or an application processor (AP). The information processing structure may further include an application-specific integrated circuit (ASIC). The information processing structure may be an electronic structure that can perform information processing.

In this embodiment, the information processing structure may implement functions of the foregoing units by executing preset code or stored instructions in a memory. The social account of the target object is determined precisely by matching the first identity information with offline second identity information, so as to perform subsequent operations such as information promotion and information mining by using the social account of the target object. For example, because of an identity characteristic of a target user, the target user may be interested in some information. Therefore, directed information promotion, such as an advertisement release, may be implemented more efficiently by mining a social account of the target user. When the target object is an opinion leader, it is quite possible that information released, edited, or focused on by the opinion leader are interesting and attractive to another user regarding the target object as his or her opinion leader. Therefore, information released by the social account can be mined, and then is released on another platform or promoted to another social account, to implement precise information transmission.

In some embodiments, the locating unit 110 is configured to: match a group attribute of a candidate social group with the attribute information; and select a social group having a group attribute matching the attribute information as the target social group. For example, the locating unit 110 may select the target social group by matching attribute information of a target user and the group attribute of the candidate social group. The group attribute may include information such as a group name, a group remark, or a group label that can reflect an identity characteristic of a group member in the social group.

In some embodiments, the server further includes an establishment unit, a clustering unit, and a filtering unit. The establishment unit is configured to establish a group community, the group community including at least two social groups which satisfy a preset degree of association relationship; the clustering unit is configured to: perform information clustering on the attribute information of the social group, determine a clustering subject, and determine a target clustering subject matching the attribute information with a matching degree therebetween satisfying a preset matching degree; and the filtering unit is configured to: filter out the group community unrelated to the target clustering subject, and obtain a target group community related to the target clustering subject. A social group in the target group community is a candidate social group. In this embodiment, the establishment unit, the clustering unit, and the filtering unit may all be corresponding to the foregoing information processing structure. The target group community is located by means of information processing of the information processing structure, and a social group in the target group community is determined as the candidate social group. In this way, apparently, a range for selecting a candidate social group is greatly reduces, thereby simplifying subsequent locating of a target social group, and improving efficiency of determining a social account of a target object.

For example, the establishment unit is configured to: establish a community network including at least two social groups, where the at least two social groups are nodes in the community network. When a first node and a second node include a same social account, a directed edge is arranged between the first node and the second node; and an edge weight of the directed edge is equal to a ratio of the first value and the second value, where the first value is a number of same social accounts included in both the first node and the second node, and the second value is a number of social accounts included in the second node; traverse the community network, use each node as a target node, and collect a node label of a neighboring node of the target node and an indegree edge weight of a corresponding indegree edge, where the indegree edge weight is an edge weight of a directed edge in a direction from the neighboring node to the target node, the target node is a node in the community network, and an initial value of the node label is a node identifier of the corresponding node; add the indegree edge weights corresponding to a same node label; replace a node label of the target node with a node label corresponding to a maximum indegree edge weight; and classify, after traversing the community network, social groups having a same node label into a group community.

By means of group community classification, it is convenient to subsequently select, according to attribute information of a target user, a social group which the target user may be in for the first time, so as to reduce information processing amount, and improve processing efficiency.

In some embodiments, the parsing unit 120 is configured to: extract remark information of each social account in the target social group, the remark information being information used to mark an identity of the user; and extract the first identity information from the remark information. In this embodiment, the parsing unit 120 may extract the remark information of each social group in the social account, to obtain the identity information. Herein, the remark information may be information in a specified field or of a specified type. There may be user identity information marked by a user in the information in a specified field or of specified type. Therefore, the information may be parsed to obtain the first identity information.

According to a source of the remark information, the remark information may include a friend remark information, a group remark information, and an account remark information. Therefore, the remark information includes at least one of the friend remark information, the group remark information, and the account remark information, where the friend remark information is remark information made by a friend account of a first social account on the first social account, the group remark information is remark information of the first social account in the social group, and the account remark information is remark information made by the first social account on the identity of the user.

Network information may be relatively informal, and a user's name is often written to a homonym. To avoid matching failure caused by this phenomenon, in this embodiment, the parsing unit 120 is specifically configured to extract articulation or pronunciation information of the first identity information; and the matching unit 130 is configured to match the articulation or pronunciation information of the first identity information with articulation or pronunciation information of the second identity information. By means of the matching based on articulation or pronunciation information, a matching success rate may be increased, thereby further increasing a success rate of determining the social account of the target object.

In addition, the determining unit 140 is configured to: when there is a plurality of the target objects and the target objects are associated with each other, extract a friend account of the target object whose social account is determined; and parse the preset information of the friend account, and obtain the second identity information to be matched with the first identity information. To further increase a success rate of locating a social account of a target user, in this embodiment, the locating manner is not limited to matching based on social accounts in a target social group. Instead, a friend relationship link of a determined social account is also used for locating, to improve a success rate of determining a social account of a target object.

Figure 4:
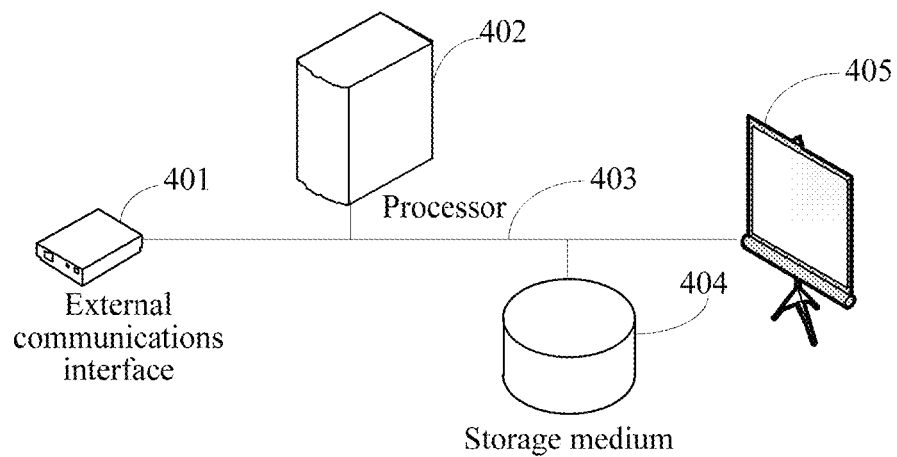
FIG. 4 is a schematic structural diagram of another server according to an embodiment of the present disclosure.

As shown in FIG. 4, an embodiment of the present disclosure further provides another server. The server includes a processor 402, a storage medium 404, a display 405, and at least one external communications interface 401. The processor 402, the storage medium 404, and the external communications interface 401 are connected by using a bus 403. The processor 402 may be an electronic component having a processing function, for example, a microprocessor, a central processing unit, a digital signal processor, or a programmable logic array.

The storage medium 404 stores computer executable instructions. The processor 402 executes the computer executable instructions stored in the storage medium 404, so as to implement the method for a social account of a target object provided in any of the foregoing technical solutions. Specifically, the method shown in FIG. 1 may be performed.

An embodiment of the present disclosure further provides a computer storage medium, computer executable instructions being stored in the computer storage medium, and the computer executable instructions being used to perform at least one of the foregoing method for mining a social account of a target object, for example, perform at least one of the method shown in FIG. 1, FIG. 2, FIG. 5, FIG. 11, and FIG. 12. The computer storage medium may be a random storage medium (RAM), a read-only storage medium (ROM), a flash memory, or a magnetic tape, and optionally, may be a non-transitory storage medium.

The following provides several examples with reference to any of the foregoing embodiments.

Example 1

Figure 5:
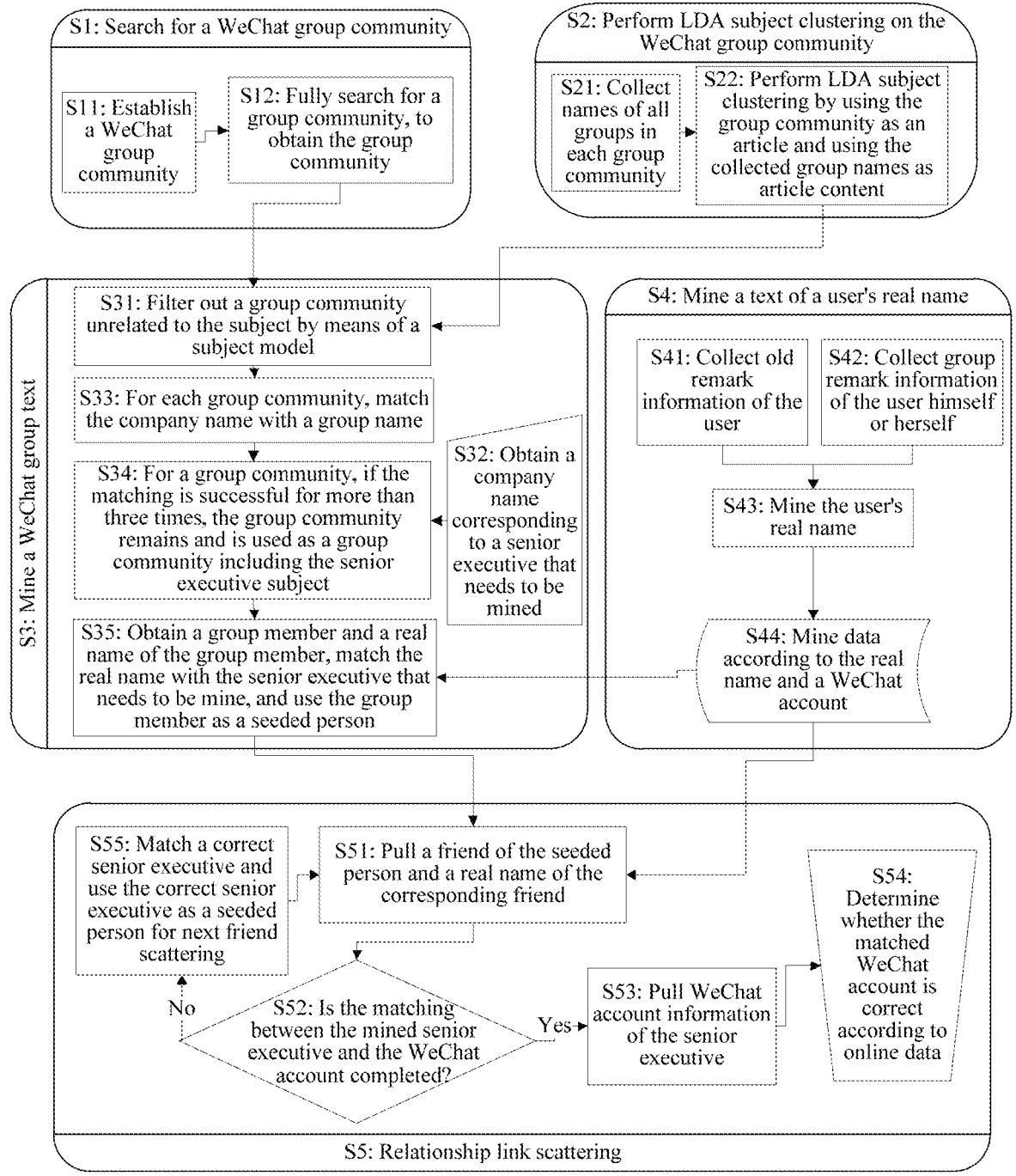
FIG. 5 is a schematic flowchart of a method for mining a social account of a target object according to an embodiment of the present disclosure.

As shown in FIG. 5, in this example, WeChat is used as a social tool, and a method for mining a WeChat account of a target object is provided. The method may include 5 steps, and are respectively:

Step S1: Search for a WeChat group community;
Step S2: Perform LDA subject clustering on the WeChat group community;
Step S3: Mine a WeChat group text;
Step S4: Mine a text of a user's real name, where the real name may include a name used in social life of the user offline; and
Step S5: Perform relationship link scattering, to obtain a social account of a target object.

Step S1 may include:
Step S11: Establish a WeChat group community; and

Step S12: Fully search for a group community, to obtain the group community. Herein, the fully searching for a group community includes: forming community network based on all social groups, and classifying community network to form a group community including a plurality of social groups meeting a preset correlation degree.

Step S2 may include:

Step S21: Collect all group names in each group community; and

Step S22: Perform LDA subject clustering by using the group community as an article and using the collected group names as article content.

Step S3 may include:

Step S31: Filter out a group community unrelated to the subject by means of a subject model;

Step S32: Obtain a company name corresponding to a senior executive that needs to be mined;

Step S33: For each group community, match the company name with a group name;

Step S34: When the matching for a group community is successful for more than three times, the group community remains and is used as a group community including the senior executive subject; and Step S35: Obtain a group member and a real name of the group member, match the real name with the senior executive that needs to be mined, and use the group member as a seeded person.

Step S4 may include:

Step S41: Collect old remark information of the user;

Step S42: Collect group remark information of the user himself or herself;

Step S43: Mine the user's real name, where the real name of the user is corresponding to the foregoing first identity information, and may include a name, an appellation, a title, or the like of the user offline; and Step S44: Mine data according to the real name and a WeChat account.

Step S5 may include:

Step S51: Pull a friend of the seeded person and a corresponding real name, where the seeded person is equivalent to the target object whose social account is already determined in the foregoing embodiment.

Step S52: Determine whether the matching between the mined senior executive and the WeChat account completes. When the matching does not complete, perform step S55. When the matching completes, perform step S53. In another embodiment, Step S52 may include determine whether the matching between the mined senior executive and the WeChat account succeeds. When the matching does not succeed, perform step S55. When the matching succeeds, perform step S53. Step S55 may include matching a correct senior executive and using the correct senior executive as a seeded person for next friend scattering.

Step S53: Pull WeChat account information of the senior executive. For the present disclosure, in a specific implementation process, the social account may be a social account such as a QQ account, a Facebook account, or a Twitter account. The pulled WeChat account information of the senior executive may include the WeChat account, and may further include other information such as a WeChat friend of the senior executive.

Step S54: Determine whether the matched WeChat account is correct according to online data.

Example 2

The following describes an example of search a chief executive officer (CEO) of a company M. A WeChat account used by the CEO of the company M is located. It can be learned by means of analysis of attribute information of the CEO of the company M that, the CEO of the company M is job title identity information of the target user, and the company M is an Internet company. One attribute of the company is related to Internet. First, based on the attribute of the Internet, a WeChat group associated with the Internet may be selected. For example, Letv may be an internet related company. A WeChat group related to Letv is selected by using Letv as attribute information. Then, offline identity information of a Letv CEO is matched with the identity information extracted from WeChat, to determine a WeChat account of the Letv CEO. For example, the offline identity information may include a name A of the Letv CEO. Specific procedures of the method in this example may be as follows:

First, search for a WeChat group community of the company M.

1) After Internet-related industries is filtered by means of a WeChat group community subject, group names containing a keyword "Letv" are matched by means of name characters, and a group community including at least three group names for which the matching is successful is selected. Herein, matching of a group community is fuzzy matching, and a matching effect is shown in FIG. 6.

2) A group community meeting the senior executive subject is filtered. After the filtering, remaining social groups are shown in FIG. 7. FIG. 7 shows target social groups after filtering is performed on the candidate social groups shown in FIG. 6.

Figures 8, 9:
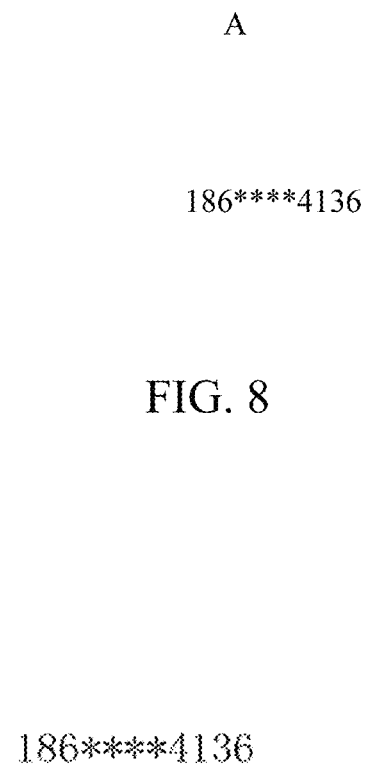

Then, first identity information of a user corresponding to each WeChat account is obtained by parsing remark information. For example, basic information of the user is searched for; and the found information is checked. FIG. 8 and FIG. 9 show first identity information determined according to a WeChat account after the WeChat account is determined.

Then, the first identity information is matched with second identity information obtained in another manner, to determine a WeChat account used by the CEO of company M.

As shown in FIG. 10, a social group in which a user with a name A joins is determined according to a social account corresponding to the user with the name A.

In another embodiment, a structure of the WeChat group community network may be constructed as following.

Diagram type: Directed diagram;

Diagram node: A WeChat group corresponds to a node in the diagram;

Diagram edge: Two group nodes having a same group member; and

Diagram directed edge weight:

$$\text{EdgeWeight}_{GroupY\text{-}GroupX} = \text{CommonUserCount}(GroupY, GroupX)/\text{UserCount}(GroupX)$$

CommonUserCount(GroupY, GroupX) represents a number of shared social accounts of a social group GroupY and a social group GroupX.

UserCount(GroupX) represents a number of social accounts of the social group GroupY.

$\text{EdgeWeight}_{GroupY\text{-}GroupX}$ is a diagram directed edge weight from the social group GroupY to the social group GroupX.

By means of establishment of the foregoing community network, a relationship between a small social group having a small number of members and a large social group having a large number of members may be established. For example, when a relationship is established between a department group of 100 members and a team group of 10 members, the 10 members also belong to the department group of 100 members. Apparently, during establishment of the foregoing community network, node labels of the team group of 10 members are replaced with corresponding node labels of the department group of 100 members.

There are many algorithms related to community searching. A label propagation algorithm (LPA) with simple calculation is used, and establishment is performed by using a gather apply scatter (GAS) method. For example, a community network is classified by using distributed parallel computing.

An improved distributed directed diagram LPA community searching algorithm is now described.

First, an initialization operation is performed: setting a node label of each node to a node identifier of the node itself.

Second, the node label is updated, and the updating the node label includes:

Collect operation: For each target node, collect a node identifier of an indegree neighboring node and a corresponding indegree edge weight.

Application operation: Add the collected neighbor node and the indegree edge weight separately to an indegree edge weight corresponding to the same node label, and finally select a node label corresponding to a maximum sum as a node label of the node. When a plurality of the indegree edge weights that are the same exists at the same time, a node label corresponding to a randomly selected indegree edge weight is replaced.

Scattering operation: Determine whether a newly calculated node label is different from a node label obtained by means of the last calculation. When it is determined that the newly calculated node label is different from the node label obtained by means of the last calculation, notify all neighboring nodes that a node label of this node is updated, and perform updating and calculation for a next time. In other embodiment, the updating and calculation for the next time may be an updating and calculation for a next round.

In this example, the collection operation and the scattering operation may be performed asynchronously or separately. Each time new information is received during the collection operation, the application operation and the scattering operation are performed, and updating of the node label is performed again.

In another embodiment, an identity information mini ng may be described below.

First, remark information of a user is converted into a sound representation of its pronunciation, for example, a pinyin. Then a name of the user is finally determined by separately counting a surname and a name that are of high probability. Herein, the pinyin is one of the foregoing articulation information.

For example, as shown in FIG. 11, the method includes:

Step S61: Collect remark information of a user that is made by a friend;

Step S62: Collect group remark information of the user;

Step S63: Pinyin processing: replacing names having a same pinyin with a most frequently used name;

Step S64: Extract the pinyin;

Step S65: Obtain a surname list;

Step S66: Match a most possible surname; and

Step S67: Mine data according to the real name and a WeChat account. In this example, by means of pinyin extraction and surname matching, a writing mistake can be corrected. Finally, the first identity information and the second identity information are matched by using a surname obtained through matching, so as to increase a matching success rate.

In another embodiment, an iterative scattering may be described below.

For an obtained seeded user, a relationship link of a social account of the seeded user is pulled, then a candidate user that can add N seeded users as friends at the same time is selected, the mined real name information obtained in the foregoing step is pulled, and then matching of the senior executive's name is performed. When the matching is successful, a corresponding senior executive is used as a seeded user for iteration for a next time.

Figure 12:
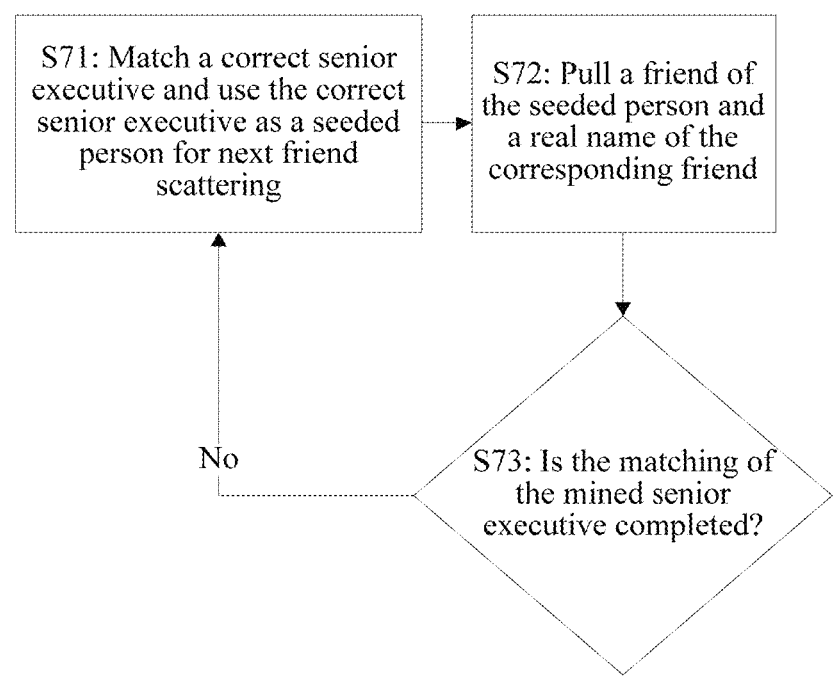
FIG. 12 is a schematic flowchart of a method for mining a social account of a target object based on relationship link expansion according to an embodiment of the present disclosure.

For example, as shown in FIG. 12, the method includes:

Step S71: Match a correct senior executive and use the correct senior executive as a seeded person for next friend scattering;

Step S72: Pull a friend of the seeded person and a real name of the corresponding friend; and Step S73: Determine whether matching of the mined senior executive completes. When the matching does not complete, return to step S71. When the matching completes, the method ends. In another embodiment, Step S73 may include determine whether matching of the mined senior executive succeeds. When the matching does not succeed, perform step S71. When the matching succeeds, the method ends.

In the several embodiments provided in this application, it should be understood that the disclosed device and method may be implemented in other manners. The described device embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in a same place, or may be distributed to many network units. Some or all of the units need to be selected according to actual requirements to implement the purpose of the solution of the embodiments.

In addition, functional units in the embodiments of the present disclosure may be all integrated in a processing module, each unit is separately used as a unit, or two or more units are integrated in a unit. The integrated unit may be implemented in a form of hardware, or may be implemented in form of hardware plus a software functional unit.

A person of ordinary skill in the technology may understand that, some or all steps for implementing the method embodiments may be implemented by using hardware related to a program instruction. The program may be stored in a computer readable storage medium. When the program is executed, the steps including the method embodiments are performed. However, the storage medium includes various types of media that may store program code, for example, a mobile storage device, a read-only memory (ROM), a random access memory (RAM), a magnetic disk, or an optical disk.

The above are only specific implementations of the present disclosure, but the protection scope of the present disclosure is not limited thereto. Modifications that are made according to the principle of the present disclosure shall fall within the protection scope of the present disclosure.

What is claimed is:

1. A method for mining a target social account of a target object, the method comprising:
establishing, by a device comprising a memory and a processor in communication with the memory, a group community comprising at least two social groups satisfying a preset degree of association relationship by:
establishing, by the device, a community network comprising the at least two social groups, wherein:
the at least two social groups comprise a first node and a second node in the community network, wherein the first node corresponds to a first social group of the at least two social groups and the second node corresponds to a second social group of the at least two social groups,
in response to the first node and the second node including at least one same social account, data is added as a directed edge between the first node and the second node, and
an edge weight of the directed edge is equal to a ratio of a first value and a second value, wherein the first value is a number of the at least one same social account in both the first node and the second node, and the second value is a number of social accounts in the second node;
traversing, by the device, the community network, using each node as a target node, and collecting a node label of a neighboring node of the target node and an indegree edge weight of a corresponding indegree edge, wherein:
the target node comprises a node in the community network, and
an initial value of the node label comprises a node identifier of a corresponding node;
in response to more than one neighboring nodes having a same node label, adding, by the device, indegree edge weights corresponding to the more than one neighboring nodes having the same node label, the same node label indicating the more than one neighboring nodes being classified into a same group community;
replacing, by the device, a node label of the target node with a node label corresponding to a maximum indegree edge weight; and
after traversing the community network, classifying, by the device, social groups having the same node label into the group community;
locating, by the device from the group community, a target social group comprising a target object by using attribute information of the target object;
parsing, by the device, preset information of a social account in the target social group, and obtaining first identity information of a user corresponding to the social account by:
extracting, by the device, remark information of each social account in the target social group, the remark information comprising information used to mark an identity of the user, and
extracting, by the device, the first identity information from the remark information by:
identifying, by the device, a sound representation of the first identity information;
determining, by the device, whether the first identity information matches with second identity information of the target object, the first identity information comprising a job title of the user, by:
determining, by the device, whether the sound representation of the first identity information matches with a sound representation of the second identity information;
when it is determined that the first identity information matches with the second identity information of the target object, labeling, by the device, the social account corresponding to the first identity information as a target social account of the target object;
determining, by the device, a target clustering object matching the attribute information of the target object with a matching degree satisfying a preset matching degree, the matching degree indicating association relationship between attribute information of the target clustering object and the target object, and the target clustering object being related to the target social group comprising the target object;
filtering out, by the device, the group community unrelated to the target clustering subject, and obtaining a target group community related to the target clustering subject, the target group community comprising the target social group;
labeling, by the device, a social group in the target group community as a candidate social group for the target social group; and
wherein the edge weight is calculated according to $$W_{Gy \to Gx} = \text{Count}_{com}(Gy, Gx)/\text{Count}(Gx)$$

$W_{Gy \to Gx}$ represents the edge weight from the first social group $Gy$ to the second social group Gx, $\text{Count}_{com}(Gy, Gx)$ respresents a number of shared social accounts of the first social group $Gy$ and the second social group $Gx$, and $\text{Count}(Gx)$ is a number of social accounts of the first social group.

2. The method according to claim 1, wherein the locating the target social group comprising the target object by using the attribute information of the target object comprises:
matching a group attribute of the candidate social group with the attribute information of the target object; and
selecting a social group having a group attribute matching the attribute information as the target social group.

3. The method according to claim 1, wherein:
the remark information comprises at least one of:
a friend remark information,
a group remark information, or
an account remark information;
the friend remark information comprises remark information made by a friend account of a first social account on the first social account;
the group remark information comprises remark information of the first social account in the target social group; and
the account remark information comprises remark information made by the first social account on the identity of the user.

4. The method according to claim 1, further comprising:
when there is a plurality of target objects and the target objects are associated with each other:
extracting, by the device, a friend account of the target object whose social account is determined; and
parsing, by the device, preset information of the friend account, and obtaining the second identity information to be matched with the first identity information.

5. A server for mining a target social account of a target object, the server comprising:

a memory storing instructions; and
a processor in communication with the memory, wherein, when the processor executes the instructions, the instructions are configured to cause the server to:
  establish a group community comprising at least two social groups satisfying a preset degree of association relationship by:
    establishing a community network comprising the at least two social groups, wherein:
      the at least two social groups comprise a first node and a second node in the community network, wherein the first node corresponds to a first social group of the at least two social groups and the second node corresponds to a second social group of the at least two social groups,
    in response to the first node and the second node including at least one same social account, data is added as a directed edge between the first node and the second node, and
    an edge weight of the directed edge is equal to a ratio of a first value and a second value, wherein the first value is a number of the at least one same social account in both the first node and the second node, and the second value is a number of social accounts in the second node;
  traversing the community network, using each node as a target node, and collecting a node label of a neighboring node of the target node and an indegree edge weight of a corresponding indegree edge, wherein:
    the target node comprises a node in the community network, and
    an initial value of the node label comprises a node identifier of a corresponding node;
  in response to more than one neighboring nodes having a same node label, adding indegree edge weights corresponding to the more than one neighboring nodes having the same node label, the same node label indicating the more than one neighboring nodes being classified into a same group community;
  replacing a node label of the target node with a node label corresponding to a maximum indegree edge weight; and
  after traversing the community network, classifying social groups having the same node label into the group community;
locate, from the group community, a target social group comprising a target object by using attribute information of the target object;
parse preset information of a social account in the target social group, and obtain first identity information of a user corresponding to the social account by:
  extracting remark information of each social account in the target social group, the remark information comprising information used to mark an identity of the user, and
  extracting the first identity information from the remark information by:
    identifying a sound representation of the first identity information;
  determine whether the first identity information matches with second identity information of the target object, the first identity information comprising a job title of the user, by:
    determining whether the sound representation of the first identity information matches with a sound representation of the second identity information;
  when it is determined that the first identity information matches the second identity information of the target object, label the social account corresponding to the first identity information as a target social account of the target object;
determine a target clustering object matching the attribute information of the target object with a matching degree satisfying a preset matching degree, the matching degree indicating association relationship between attribute information of the target clustering object and the target object, and the target clustering object being related to the target social group comprising the target object;
filter out the group community unrelated to the target clustering subject, and obtaining a target group community related to the target clustering subject, the target group community comprising the target social group; and
label a social group in the target group community as a candidate social group for the target social group; and
wherein the edge weight is calculated according to $$W_{Gy \to Gx} = \text{Count}_{com}(Gy, Gx) / \text{Count}(Gx)$$

$W_{Gy \to Gx}$ represents the edge weight from the first social group $Gy$ to the second social group $Gx$, $\text{Count}_{com}(Gy, Gx)$ respresents a number of shared social accounts of the first social group $Gy$ and the second social group $Gx$, and $\text{Count}(Gx)$ is a number of social accounts of the first social group.

6. The server according to claim 5, wherein, when the instructions are configured to cause the server to locate the target social group comprising the target object by using the attribute information of the target object, the instructions are configured to cause the server to:
  match a group attribute of the candidate social group with the attribute information of the target object; and
  select a social group having a group attribute matching the attribute information as the target social group.

7. The server according to claim 5, wherein:
  the remark information comprises at least one of:
    a friend remark information,
    a group remark information, or
    an account remark information;
  the friend remark information comprises remark information made by a friend account of a first social account on the first social account;
  the group remark information comprises remark information of the first social account in the target social group; and
  the account remark information comprises remark information made by the first social account on the identity of the user.

8. The server according to claim 5, wherein, when the processor executes the instructions, the instructions are configured to further cause the server to:
  when there is a plurality of target objects and the target objects are associated with each other:
    extract a friend account of the target object whose social account is determined; and
    parse preset information of the friend account, and obtain the second identity information to be matched with the first identity information.

9. A non-transitory computer readable storage medium storing instructions, wherein the instructions, when executed by a processor, cause the processor to perform:
- establishing a group community comprising at least two social groups satisfying a preset degree of association relationship by:
  - establishing a community network comprising the at least two social groups, wherein:
    - the at least two social groups comprise a first node and a second node in the community network, wherein the first node corresponds to a first social group of the at least two social groups and the second node corresponds to a second social group of the at least two social groups,
    - in response to the first node and the second node including at least one same social account, data is added as a directed edge between the first node and the second node, and
    - an edge weight of the directed edge is equal to a ratio of a first value and a second value, wherein the first value is a number of the at least one same social account in both the first node and the second node, and the second value is a number of social accounts in the second node;
  - traversing the community network, using each node as a target node, and collecting a node label of a neighboring node of the target node and an indegree edge weight of a corresponding indegree edge, wherein:
    - the target node comprises a node in the community network, and
    - an initial value of the node label comprises a node identifier of a corresponding node;
  - in response to more than one neighboring nodes having a same node label, adding indegree edge weights corresponding to the more than one neighboring nodes having the same node label, the same node label indicating the more than one neighboring nodes being classified into a same group community;
  - replacing a node label of the target node with a node label corresponding to a maximum indegree edge weight; and
  - after traversing the community network, classifying social groups having the same node label into the group community;
- locating, from the group community, a target social group comprising a target object by using attribute information of the target object;
- parsing preset information of a social account in the target social group, and obtaining first identity information of a user corresponding to the social account by:
  - extracting remark information of each social account in the target social group, the remark information comprising information used to mark an identity of the user, and
  - extracting the first identity information from the remark information by:
    - identifying a sound representation of the first identity information;
- determining whether the first identity information matches with second identity information of the target object, the first identity information comprising a job title of the user, by:
  - determining whether the sound representation of the first identity information matches with a sound representation of the second identity information;
- when it is determined that the first identity information matches with the second identity information of the target object, labeling the social account corresponding to the first identity information as a target social account of the target object;
- determining a target clustering object matching the attribute information of the target object with a matching degree satisfying a preset matching degree, the matching degree indicating association relationship between attribute information of the target clustering object and the target object, and the target clustering object being related to the target social group comprising the target object;
- filtering out the group community unrelated to the target clustering subject, and obtaining a target group community related to the target clustering subject, the target group community comprising the target social group;
- labeling a social group in the target group community as a candidate social group for the target social group; and
- wherein the edge weight is calculated according to $$W_{Gy \to Gx} = \text{Count}_{com}(Gy, Gx)/\text{Count}(Gx)$$

$W_{Gy \to Gx}$ represents the edge weight from the first social group $Gy$ to the second social group Gx, $\text{Count}_{com}(Gy, Gx)$ respresents a number of shared social accounts of the first social group $Gy$ and the second social group $Gx$, and $\text{Count}(Gx)$ is a number of social accounts of the first social group.

10. The non-transitory computer readable storage medium according to claim 9, wherein, when the instructions cause the processor to perform the locating the target social group comprising the target object by using the attribute information of the target object, the instructions cause the processor to perform:
- matching a group attribute of the candidate social group with the attribute information of the target object; and
- selecting a social group having a group attribute matching the attribute information as the target social group.

* * * * *